(12) United States Patent
Yamamoto

(10) Patent No.: US 11,023,738 B2
(45) Date of Patent: Jun. 1, 2021

(54) INFORMATION PROCESSING APPARATUS SELECTING HIGHLIGHT SECTION FROM VIDEO, INFORMATION PROCESSING METHOD, AND PROGRAM

(71) Applicant: CANON KABUSHIKI KAISHA, Tokyo (JP)

(72) Inventor: Tatsuya Yamamoto, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 68 days.

(21) Appl. No.: 16/428,463

(22) Filed: May 31, 2019

(65) Prior Publication Data

US 2019/0384988 A1  Dec. 19, 2019

(30) Foreign Application Priority Data

Jun. 13, 2018  (JP) .............................. JP2018-112751

(51) Int. Cl.
*G06K 9/00* (2006.01)
*G06T 7/174* (2017.01)
*G06T 7/136* (2017.01)
*G06T 7/11* (2017.01)

(52) U.S. Cl.
CPC ..... *G06K 9/00765* (2013.01); *G06K 9/00228* (2013.01); *G06K 9/00751* (2013.01); *G06T 7/11* (2017.01); *G06T 7/136* (2017.01); *G06T 7/174* (2017.01); *G06T 2207/10016* (2013.01)

(58) Field of Classification Search
CPC .......... G06K 9/00765; G06K 9/00751; G06K 9/00228; G06T 7/174; G06T 7/136; G06T 7/11; G06T 2207/10016
USPC ...................................................... 382/173
See application file for complete search history.

(56) References Cited

U.S. PATENT DOCUMENTS

| 10,430,838 B1* | 10/2019 | Andreou ............... G06F 40/166 |
| 2010/0284670 A1* | 11/2010 | Li ...................... G06K 9/00751 386/278 |
| 2019/0267041 A1* | 8/2019 | Ricciardi ............. G11B 27/031 |

FOREIGN PATENT DOCUMENTS

| JP | 10-112835 A | 4/1998 |
| WO | 2005086478 A1 | 9/2005 |

* cited by examiner

*Primary Examiner* — Jerome Grant, II
(74) *Attorney, Agent, or Firm* — Canon U.S.A., Inc. IP Division

(57) ABSTRACT

An apparatus that connects frames included in one video to make a highlight video shorter than the video evaluates whether each of the frames included in the video is appropriate as a component of the highlight video, identifies one or more candidate sections including continuous frames that are evaluated higher than a reference, and makes the highlight video by preferentially using the frames included in a longer candidate section, among the one or more candidate sections.

19 Claims, 13 Drawing Sheets

FIG. 3

| ID | FRAME NUMBER | LUMINANCE VARIATION | FACE SCORE | EVALUATION VALUE |
|---|---|---|---|---|
| 1 | 1 | 0 | 0 | 0 |
| 2 | 18 | 0.1 | 0 | 0.1 |
| 3 | 31 | 0.5 | 0 | 0.5 |
| 4 | 46 | 0.6 | 0.3 | 0.9 |
| 5 | 61 | 0.4 | 0 | 0.4 |
| 6 | 76 | 0.3 | 0 | 0.3 |
| 7 | 91 | 0.1 | 0 | 0.1 |
| 8 | 106 | 0.3 | 0 | 0.3 |
| 9 | 121 | 0.5 | 0 | 0.5 |
| 10 | 136 | 0.6 | 0 | 0.6 |
| 11 | 151 | 0.5 | 0.4 | 0.9 |
| 12 | 166 | 0.3 | 0.7 | 1.0 |
| 13 | 181 | 0.4 | 0.8 | 1.0 |
| 14 | 196 | 0.5 | 0.4 | 0.9 |
| 15 | 211 | 0.4 | 0 | 0.4 |
| ⋮ | | | | |
| 61 | 901 | 0.1 | 0 | 0.1 |

| ID | CANDIDATE ID | START FRAME ID | END FRAME ID | LENGTH | SCORE |
|---|---|---|---|---|---|
| 1 | 1 | 10 | 13 | 60 | |
| 2 | 1 | 9 | 9 | 15 | |
| 3 | 1 | 14 | 14 | 15 | |
| 4 | 2 | 26 | 28 | 45 | |
| 5 | 3 | 39 | 42 | 60 | |
| 6 | 4 | 51 | 54 | 60 | |
| 7 | 4 | 49 | 50 | 30 | |
| 8 | 4 | 55 | 56 | 30 | |
| 9 | 4 | 47 | 48 | 30 | |
| 10 | 4 | 57 | 58 | 30 | |

| ID | CANDIDATE ID | START FRAME ID | END FRAME ID | LENGTH | SCORE |
|---|---|---|---|---|---|
| 1 | 1 | 10 | 13 | 60 | 9 |
| 2 | 1 | 9 | 9 | 15 | |
| 3 | 1 | 14 | 14 | 15 | |
| 4 | 2 | 26 | 28 | 45 | 7 |
| 5 | 3 | 39 | 42 | 60 | 8 |
| 6 | 4 | 51 | 54 | 60 | 10 |
| 7 | 4 | 49 | 50 | 30 | |
| 8 | 4 | 55 | 56 | 30 | |
| 9 | 4 | 47 | 48 | 30 | |
| 10 | 4 | 57 | 58 | 30 | |

| ID | CANDIDATE ID | START FRAME ID | END FRAME ID | LENGTH | SCORE |
|---|---|---|---|---|---|
| 1 | 1 | 10 | 13 | 60 | 9 |
| 2 | 1 | 9 | 9 | 15 | 4 |
| 3 | 1 | 14 | 14 | 15 | 3 |
| 4 | 2 | 26 | 28 | 45 | 7 |
| 5 | 3 | 39 | 42 | 60 | 8 |
| 6 | 4 | 51 | 54 | 60 | 10 |
| 7 | 4 | 49 | 50 | 30 | 6 |
| 8 | 4 | 55 | 56 | 30 | 5 |
| 9 | 4 | 47 | 48 | 30 | 2 |
| 10 | 4 | 57 | 58 | 30 | 1 |

FIG. 15

| ID | FRAME NUMBER | LUMINANCE VARIATION | FACE SCORE | COMPLEMENTARY FACE SCORE | EVALUATION VALUE |
|---|---|---|---|---|---|
| 1 | 1 | 0 | 0 | 0 | 0 |
| 2 | 16 | 0.1 | 0 | 0 | 0.1 |
| 3 | 31 | 0.5 | 0 | 0.3 | 0.8 |
| 4 | 46 | 0.6 | 0.3 | 0.3 | 0.9 |
| 5 | 61 | 0.4 | 0 | 0.6 | 1.0 |
| 6 | 76 | 0.3 | 0.6 | 0.6 | 0.9 |
| 7 | 91 | 0.1 | 0.1 | 0.6 | 0.7 |
| 8 | 106 | 0.1 | 0 | 0.1 | 0.1 |
| 9 | 121 | 0.0 | 0 | 0 | 0.0 |
| ⋮ | | | | | |
| 75 | 901 | 0.2 | 0 | 0 | 0.2 |

1501

INFORMATION PROCESSING APPARATUS SELECTING HIGHLIGHT SECTION FROM VIDEO, INFORMATION PROCESSING METHOD, AND PROGRAM

BACKGROUND

Field of the Disclosure

The present disclosure relates to a technology of processing video information.

Description of the Related Art

Many users hold non-edited videos which the users have captured because videos are easily captured with the spread of digital cameras and smartphones in recent years. When the users view the videos, a method of viewing a video, for example, resulting from extraction of only highlight portions of the video for shortening is widely known in order to prevent the playback time of the video from being too long or prevent the users from being bored during the playback. Such a video is hereinafter referred to as a highlight video. "Highlight" means characteristic portions (for example, most interesting or memorable scenes) in the video.

However, it is very troublesome to manually extract only the highlight portions from the video to make the highlight video. In order to resolve such a problem, International Publication No. 2005/086478 discloses a technology of evaluating frames included in a video and setting sections (frame groups) in which the frames, for example, having evaluation values higher than or equal to a threshold value continuously exist as highlight candidate sections to enable making of the highlight video using the candidate sections. In addition, International Publication No. 2005/086478 also discloses a technology of selecting, for example, a candidate section including the frame having the highest evaluation value, a candidate section in which the evaluation values of the frames are greatly varied, or a candidate section in which the sum of the evaluation values of the frames is maximized to make the highlight video.

As described above, since the highlight video is made using the candidate sections, the candidate sections desirably correspond to the highlight portions of the video. In addition, since the candidate sections are set based on the evaluation values of the frames, it is desirable to determine whether each frame in the video is included in the highlight with high accuracy with the evaluation method for calculating the evaluation values. However, it is difficult to determine the frames included in the highlight in the video with high accuracy with the method of evaluating the frames disclosed in International Publication No. 2005/086478.

SUMMARY

According to an embodiment of the present disclosure, an apparatus that connects frames included in one video to make a highlight video shorter than the video includes an evaluating unit configured to evaluate whether each of the frames included in the video is appropriate as a component of the highlight video; an identifying unit configured to identify one or more candidate sections including continuous frames that are evaluated higher than a reference by the evaluating unit; and an output unit configured to make the highlight video by using the frames included in a longer candidate section, among the one or more candidate sections.

Further features of the present disclosure will become apparent from the following description of exemplary embodiments with reference to the attached drawings.

BRIEF DESCRIPTION OF THE DRAWINGS

FIG. 3 illustrates an exemplary table used for managing frame information.

FIG. 10A, FIG. 10B, and FIG. 10C illustrate exemplary tables used for managing sub-section information.

FIG. 15 illustrates an exemplary table used for managing the frame information to which a complementary face score is added in a fourth embodiment.

DESCRIPTION OF THE EMBODIMENTS

Figure 1:
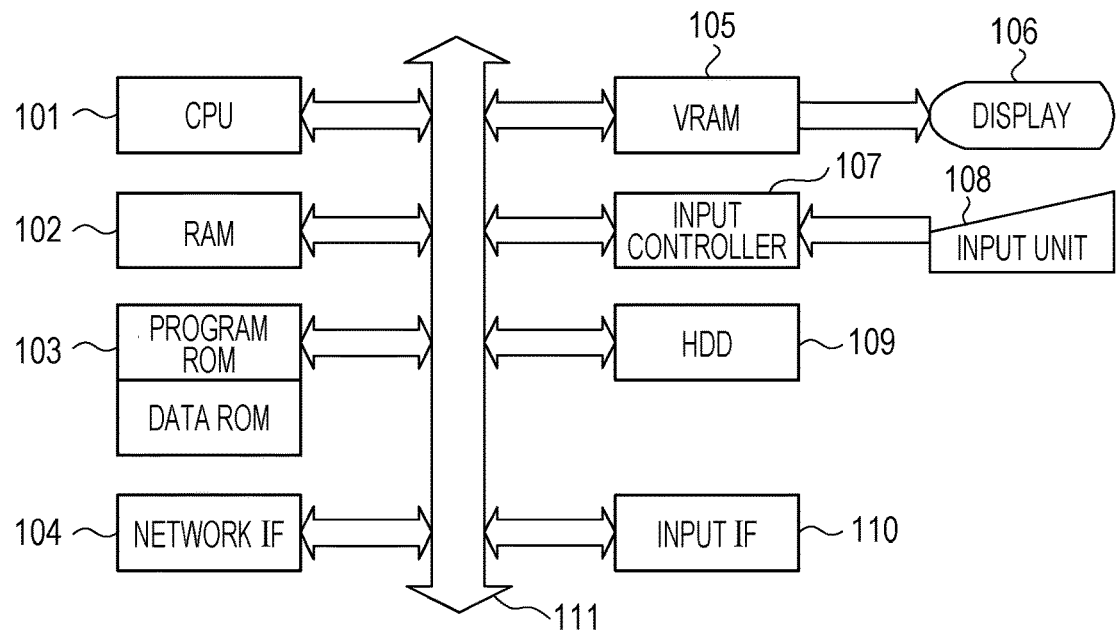
FIG. 1 illustrates an exemplary hardware configuration of an information processing apparatus in a first embodiment.

Embodiments of the present disclosure will herein be described in detail with reference to the drawings. The configurations described in the following embodiments are only examples and the present disclosure is not limited to the configurations illustrated in the drawings.

FIG. 1 illustrates an exemplary hardware configuration of an information processing apparatus 100 in a first embodiment.

Referring to FIG. 1, a central processing unit (CPU) 101 performs integral control of the entire apparatus. The CPU 101 performs calculation and processing of information and control of each piece of hardware based on a control program to realize the operation of the information processing apparatus 100 of the first embodiment. A random access memory (RAM) 102 is a general-purpose RAM and functions as a main memory of the CPU 101 or a working memory necessary for loading execution programs and executing programs. A read only memory (ROM) 103 is a general-purpose ROM and, for example, stores programs that define the procedure for realizing each operation of the information processing apparatus 100 of the first embodiment. The ROM 103 includes a program ROM in which a basic operating system (OS), which is a system program that controls the devices in a computer system, and so on are stored and a data ROM in which information necessary for operating the system and so on are stored. A hard disk drive (HDD) 109 may be used, instead of the ROM 103.

A network interface (IF) 104 controls input and output of a variety of data, such as video data, which is transmitted and received via a network, such as a local area network (LAN). The network IF 104 has a configuration corresponding to the network medium, such as a wired medium or a wireless medium. A video RAM (VRAM) 105 rasterizes an image to be displayed on the screen of a display 106, which is a display unit. The display 106 is, for example, a liquid crystal display or a liquid crystal panel. An input controller 107 controls an input signal from an input unit 108. The input unit 108 is an external input unit for accepting an operation instruction from a user. The input unit 108 is, for example, a touch panel, a keyboard, a pointing device, or a remote controller.

The HDD 109 is used to store application programs and data, such as the video data and image data. The application programs include a highlight video making application used by the CPU 101 to perform a highlight video making process described below of the first embodiment. An input IF 110 is an interface, such as a compact disc (CD)-ROM drive, a digital versatile disc (DVD)-ROM drive, or a memory card drive, for connecting to an external apparatus. The input IF 110 is used for, for example, reading out of the video data captured by a digital camera. An input-output bus 111 is used to connect the respective units described above to each other so as to be capable of communication and includes, for example, an address bus, a data bus, and a control bus.

Figure 2:
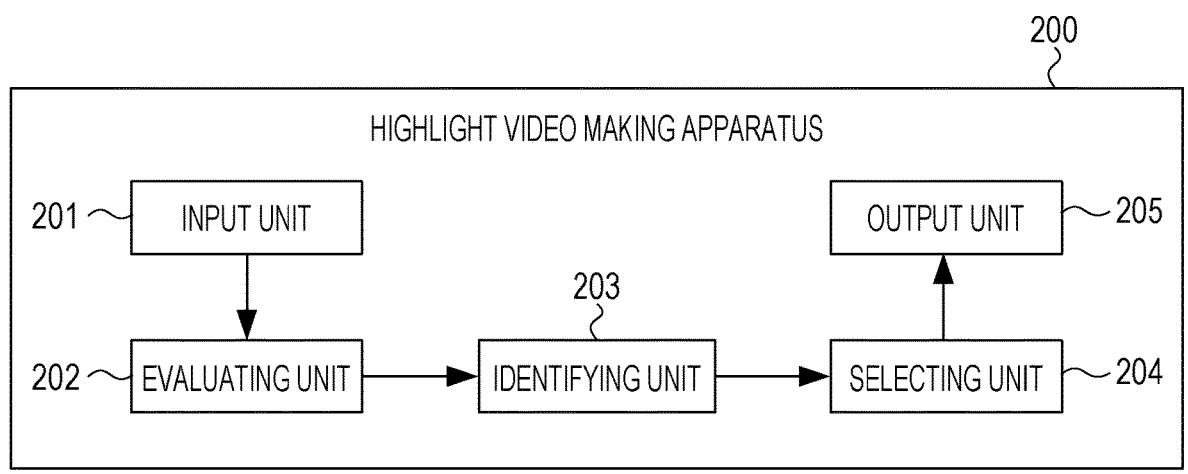
FIG. 2 is a block diagram illustrating an exemplary functional configuration of a highlight video making apparatus of the first embodiment.

FIG. 2 is a block diagram illustrating an exemplary functional configuration of a highlight video making apparatus 200 of the first embodiment, which is realized by performing the highlight video making process in the information processing apparatus 100 illustrated in FIG. 1. The highlight video making apparatus 200 of the first embodiment identifies highlight candidate sections from a video based on evaluation results (evaluation values) of frames included in the video, although described in detail below. The candidate sections are identified from the video as, for example, sections in which highly evaluated frames the evaluation values of which is higher than or equal to a predetermined threshold value continuously exist. In addition, the highlight video making apparatus 200 preferentially selects the candidate section having a relatively long length from the identified candidate sections as a highlight section appropriate for the highlight video. Then, the highlight video making apparatus 200 extracts the selected highlight section from the original video to make the highlight video. In other words, the highlight video making apparatus 200 preferentially selects the longer candidate section from the candidate sections using information about the lengths of the candidate sections as an index other than the evaluation values of the frames to enable one or more highlight sections suitable for composing the highlight video to be appropriately selected. The highlight video making apparatus 200 of the first embodiment makes the highlight video based on the selected highlight section. However, in the first embodiment, information resulting from summarization of the highlight scenes of the original video as content may be generated using a method other than the method of making the highlight video. For example, other content, such as a photobook, may be created using specific frames included in the selected highlight section.

Referring to FIG. 2, an input unit 201 reads the video data via the input IF 110, extracts an image of each frame included in the video, and stores the extracted image in the HDD 109. The target frames may be all the frames included in the video or may be only intra frames (I frames) when inter-frame prediction is used for compression and encoding of the video. In the first embodiment, the images of the I frames appearing at intervals of 15 frames per one second are read and are stored in the HDD 109.

An evaluating unit 202 calculates the evaluation values of the frames using a feature quantity, such as luminance or a specific object (a face in the first embodiment) in the image, which results from analysis of the images of the frames supplied from the input unit 201. When the camera used for capturing the video records the feature quantity of the luminance or the face as metadata during the capturing, the input unit 201 may acquire the metadata and the evaluating unit 202 may calculate the evaluation values using the metadata.

An identifying unit 203 identifies the sections in which a certain number or more of the frames having the evaluation values higher than or equal to the threshold value continuously exist as the highlight candidate sections. A selecting unit 204 selects the highlight sections based on information about the lengths of the candidate sections (for example, the number of frames) identified by the identifying unit 203. An output unit 205 extracts the multiple highlight sections selected by the selecting unit 204 from the original video and connects the extracted highlight sections to make the highlight video. The highlight video made in the above manner is, for example, stored in the HDD 109 or is displayed in the display 106. When only one highlight section is selected, one highlight section that is selected is output as the highlight video.

FIG. 3 illustrates an exemplary table used for managing information about each frame in the video, which is evaluated by the evaluating unit 202. A frame table 301 illustrated in FIG. 3 is composed of frame information including items of ID, FRAME NUMBER, LUMINANCE VARIATION, FACE SCORE, and EVALUATION VALUE. Referring to FIG. 3, ID is identification information sequentially given to the pieces of frame information. FRAME NUMBER is the frame number given to each frame (each I frame in the first embodiment) used for the analysis in the calculation of the evaluation values, among the frames of the video. LUMINANCE VARIATION is an amount of change in luminance, calculated through the frame analysis, and is a value calculated based on the difference in the luminance between the corresponding I frame and the previous I frame on the time axis. FACE SCORE is a value calculated so that the larger faces closer to the center of the image have higher values based on the coordinate and the magnitude of the face of the object, which is detected from the I frame. EVALUATION VALUE is a value resulting from addition of the value of the face score to the luminance variation to round the result of the addition in a range from zero to one. The frame the evaluation value of which is closer to one is more appropriate for the highlight in the first embodiment.

Figure 4:
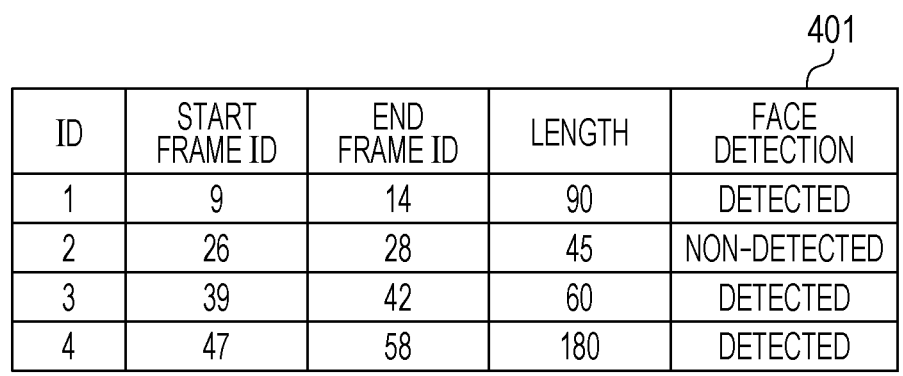
FIG. 4 illustrates an exemplary table used for managing candidate section information.

FIG. 4 illustrates an exemplary table used for managing information about each candidate section identified by the identifying unit 203. A candidate section table 401 illustrated in FIG. 4 is composed of candidate section information including items of ID, START FRAME ID, END FRAME ID, LENGTH, and FACE DETECTION. Referring to FIG. 4, ID is identification information sequentially given to the candidate sections. START FRAME ID and END FRAME ID are pieces of information about the first I frame of the corresponding section and the last I frame thereof, respectively. For example, the frame numbers are used as START FRAME ID and END FRAME ID. Although each candidate section is indicated by the start frame ID and the end frame ID, the candidate section also includes other frames, other than the I frames. In other words, in the first embodiment, since the I frames appear every 15 frames, the candidate section is terminated at a frame 14 frames after the I frame indicated by the end frame ID. LENGTH indicates a length represented by the number of frames calculated by the number of the I frames from the start frame ID to the end frame ID×15.

Figure 5:
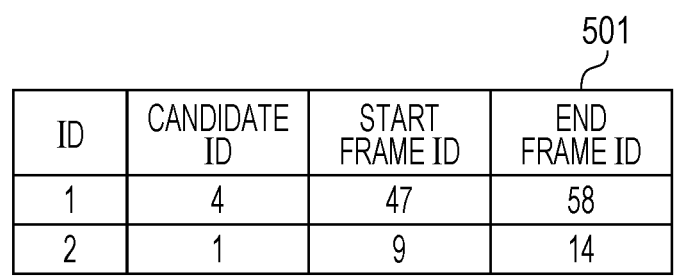
FIG. 5 illustrates an exemplary table used for managing highlight section information.

FIG. 5 illustrates an exemplary table used for managing information about the result of selection of the highlight sections selected by the selecting unit 204. A highlight section table 501 illustrated in FIG. 5 is composed of highlight section information including items of ID, CANDIDATE ID, START FRAME ID, and END FRAME ID. CANDIDATE ID indicates the ID of the corresponding candidate section. ID, START FRAME ID, and END FRAME ID in FIG. 5 are the same as those described with reference to FIG. 4.

Figure 6:
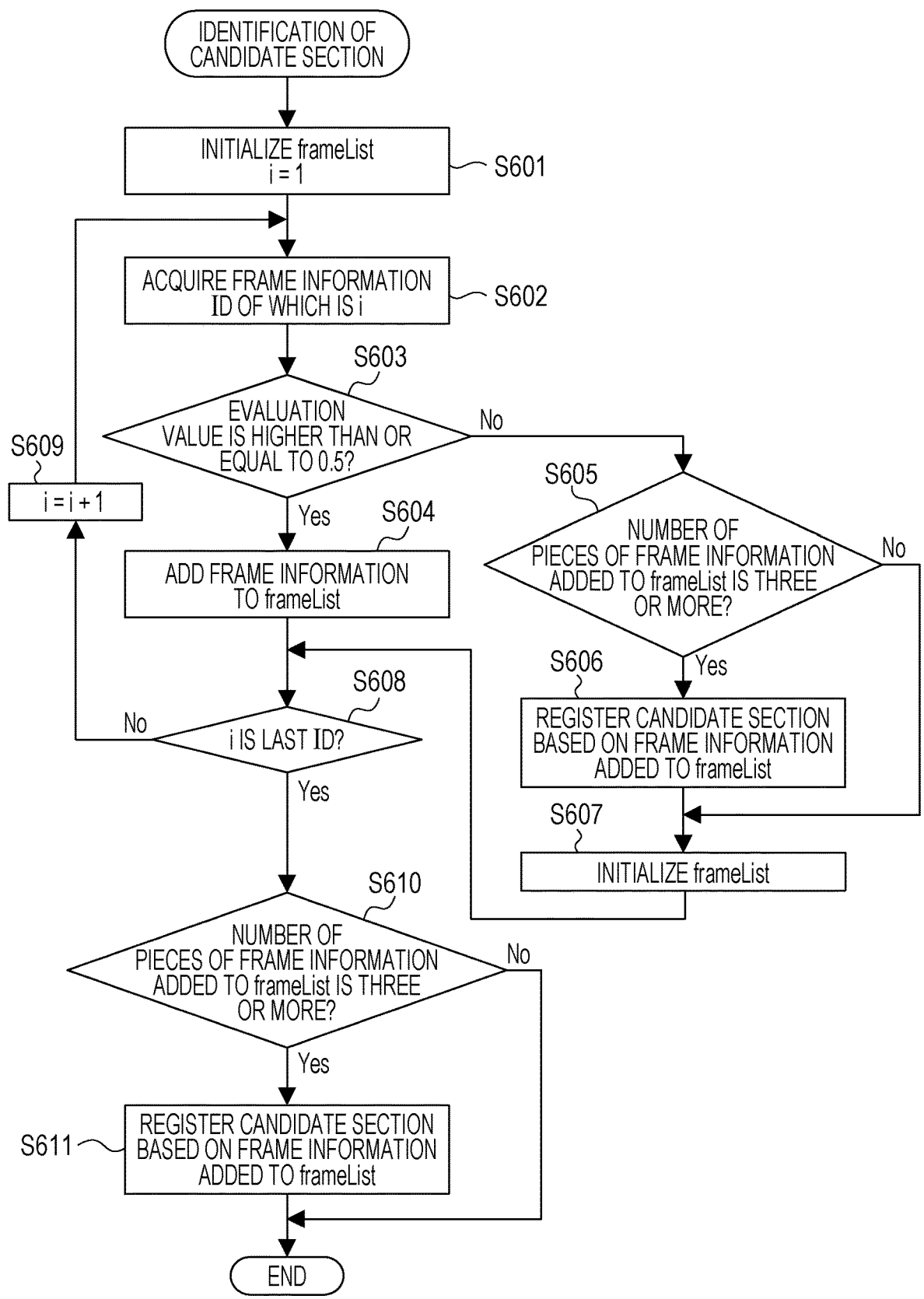
FIG. 6 is a flowchart illustrating an exemplary candidate section identifying process.

FIG. 6 is a flowchart illustrating an exemplary process of identifying the highlight candidate section from a video based on the frame information in the frame table 301 illustrated in FIG. 3, which is performed by the identifying unit 203. Steps S601 to S611 in the flowchart in FIG. 6 are abbreviated as S601 to S611 in the following description. The same applies to the other flowcharts described below.

Referring to FIG. 6, in S601, the identifying unit 203 initializes a variable frameList of a list in which the frame information in the frame table 301 is stored to null and initializes a variable i indicating the ID to one. In S602, the identifying unit 203 acquires the frame information the ID of which is the variable i from the frame table 301. Then, the process goes to S603.

In S603, the identifying unit 203 determines whether the evaluation value of the frame is higher than or equal to 0.5, which is a predetermined threshold value. Although the threshold value is set to 0.5 here, a higher value may be set as the threshold value if the frames to be included in the highlight are to be limited to the highly evaluated frames. If the identifying unit 203 determines that the evaluation value is higher than or equal to the threshold value (YES in S603), the process goes to S604. In S604, the identifying unit 203 adds the frame information to the variable frameList. Then, the process goes to S608.

If the identifying unit 203 determines that the evaluation value is lower than the threshold value (NO in S603), the process goes to S605. In S605, the identifying unit 203 determines whether the number of the pieces of frame information added to the variable frameList is three or more. If the identifying unit 203 determines that the number of the pieces of frame information added to the variable frameList is smaller than three (NO in S605), the process goes to S607. If the identifying unit 203 determines that the number of the pieces of frame information added to the variable frameList is three or more (YES in S605), the process goes to S606.

In S606, the identifying unit 203 generates the candidate section information based on the frame information added to the variable frameList and newly registers the generated candidate section information in the candidate section table 401 in FIG. 4. The start and the end of the candidate section information is indicated by the IDs of the first frame information and the last frame information, respectively, added to the variable frameList, and the length of the candidate section information is indicated by the number of frames calculated by the number of pieces of frame information added to the variable frameList×15. If at least one of the face scores in the pieces of frame information added to the variable frameList is not zero, FACE DETECTION of the candidate section information is "DETECTED". If all of the face scores in the pieces of frame information added to the variable frameList are zero, FACE DETECTION of the candidate section information is "NON-DETECTED". Then, the process goes to S607.

In S607, the identifying unit 203 initializes the variable frameList to null. Then, the process goes to S608.

In S608, the identifying unit 203 determines whether the variable i is the last ID in the frame table 301. If the identifying unit 203 determines that the variable i is not the last ID (NO in S608), in S609, the identifying unit 203 adds one to the variable i. Then, the process goes back to S602. Accordingly, S602 to S607 are repeated until the identifying unit 203 determines that the variable i is the last ID in S608. If the identifying unit 203 determines that the variable i is the last ID (YES in S608), the process goes to S610.

In S610, the identifying unit 203 determines whether the number of the pieces of frame information added to the variable frameList is three or more for the frame information about the last ID, as in S605. If the identifying unit 203 determines that the number of the pieces of frame information added to the variable frameList is smaller than three (NO in S610), the candidate section identifying process in FIG. 6 is terminated. If the identifying unit 203 determines that the number of the pieces of frame information added to the variable frameList is three or more (YES in S610), in S611, the identifying unit 203 generates the candidate section information based on the frame information added to the variable frameList and newly registers the generated candidate section information in the candidate section table 401 in FIG. 4, as in S606. Then, the candidate section identifying process in FIG. 6 is terminated. In other words, in S610 and S611, the identifying unit 203 newly registers the candidate section information in the candidate section table 401 only if the number of the pieces of frame information finally added to the variable frameList is three or more. Accordingly, the number of candidate sections is zero if the number of the pieces of frame information added to the variable frameList does not reach three until the candidate section identifying process in FIG. 6 is terminated.

Figure 7:
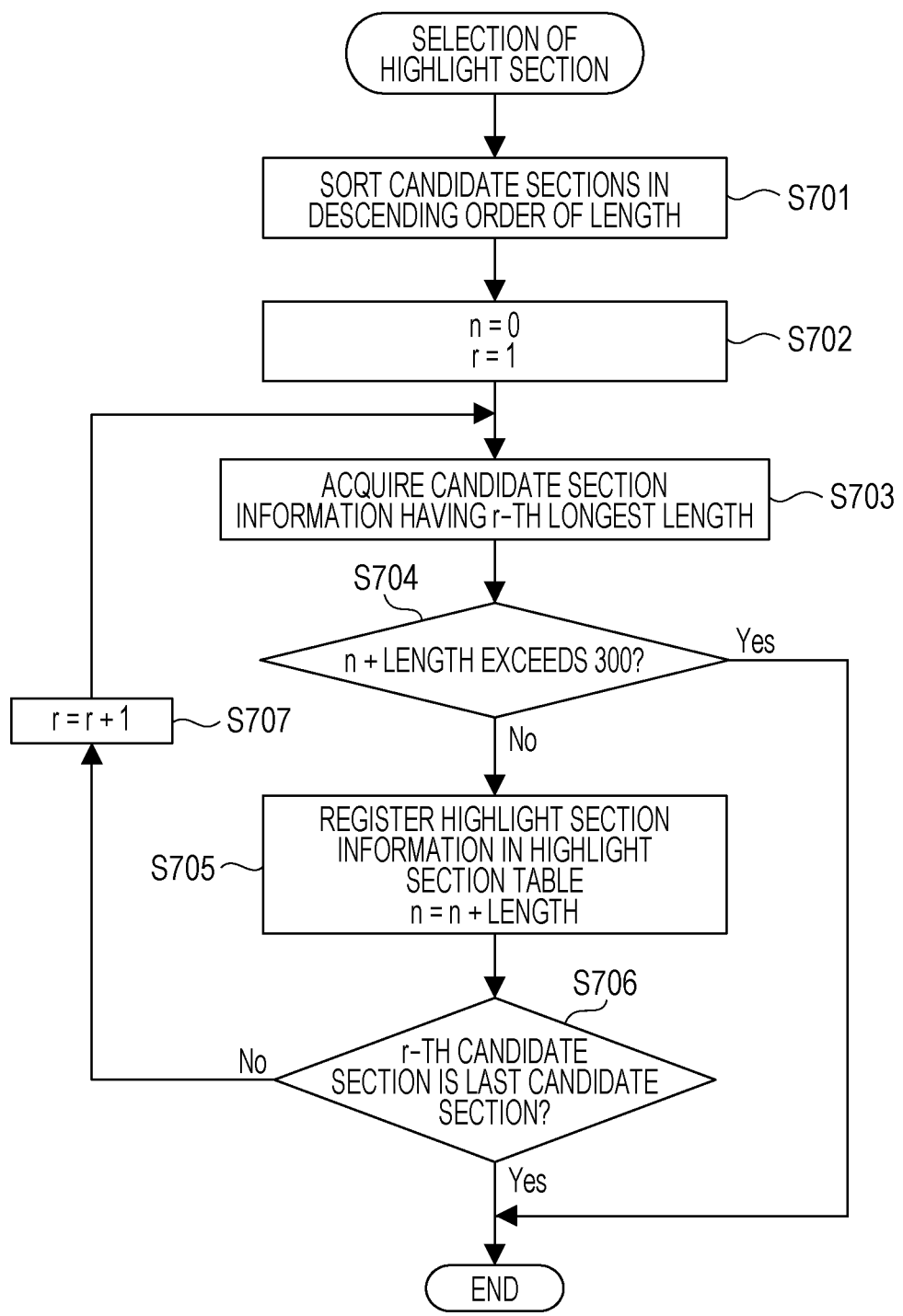
FIG. 7 is a flowchart illustrating an exemplary highlight section selecting process.

FIG. 7 is a flowchart illustrating an exemplary process of selecting the highlight section based on the candidate section information in the candidate section table 401 in FIG. 4, which is performed by the selecting unit 204.

Referring to FIG. 7, in S701, the selecting unit 204 sorts all the pieces of candidate section information registered in the candidate section table 401 in descending order of the lengths of the candidate sections. In S702, the selecting unit 204 initializes a variable n indicating the total number of frames in the selected highlight section to zero and initializes a variable r indicating the order of the length of the candidate section to one. Then, the process goes to S703.

In S703, the selecting unit 204 acquires the candidate section information having the r-th longest length from the candidate section table 401. In S704, the selecting unit 204 determines whether a value calculated by adding the length of the acquired candidate section information to the variable n exceeds 300, which is a predetermined threshold value. If the selecting unit 204 determines that the value exceeds the predetermined threshold value (YES in S704), the highlight section selecting process in FIG. 7 is terminated. If the selecting unit 204 determines that the value does not exceed the predetermined threshold value (NO in S704), the process goes to S705. Although the value of 300, which is the number of frames corresponding to 20 seconds, is used as the predetermined threshold value in S704, another value may be used as the threshold value in accordance with the upper limit of the playback time of the highlight video. In addition, the predetermined threshold value may be calculated as a dynamic threshold value based on the playback time of the input video or a desired value input by the user may be used as the predetermined threshold value.

In S705, the selecting unit 204 generates the highlight section information based on the candidate section information and newly registers the generated highlight section information in the highlight section table 501 in FIG. 5. In addition, the selecting unit 204 adds the length of the candidate section information to the variable n to update the value of variable n. Then, the process goes to S706.

In S706, the selecting unit 204 determines whether the r-th candidate section information is the last candidate section information. If the selecting unit 204 determines that the r-th candidate section information is not the last candidate section information (NO in S706), in S707, the selecting unit 204 adds one to the variable r. Then, the process goes back to S703. Accordingly, S703 to S705 are repeated until the selecting unit 204 determines that the r-th candidate section information is the last candidate section information in S706. If the selecting unit 204 determines that the r-th candidate section information is the last candidate section information (YES in S706), the highlight section selecting process in FIG. 7 is terminated. When the value calculated by adding up the lengths of the pieces of candidate section information that are selected does not exceed 300, which is the predetermined threshold value, at the time when the processing for the last candidate section information is terminated, the highlight video to be made is a video shorter than 300 frames. When one piece of candidate section information is registered in the candidate section table 401, the corresponding candidate section is selected as the highlight section.

In the first embodiment, the candidate sections to be preferentially selected are determined through the soring using the lengths of the candidate sections in S701. However, when only sufficient long candidate sections exist, all the candidate sections may be appropriate for the highlight and it is difficult to determine the candidate section to be preferentially selected using only the lengths of the candidate sections. Accordingly, the selecting unit 204 may correct the scores of the candidate sections using at least one piece information, among the evaluation values of the frames included in the candidate sections, whether any face is detected, the presence of shake in the capturing of the video, the amount of shake, and so on, in addition to the lengths of the candidate sections, and may perform the sorting using the values of the corrected scores.

Although the same start frame and the same end frame as those of the candidate section information are used for the highlight section when the highlight section is registered in S705, the frames of a number corresponding to a certain ratio may be removed at the beginning and at the end of the candidate section when the candidate section is sufficiently long and the frames after the removal may be registered. This enables uncertain frames, such as frames in the boundary between the frames that are not appropriate for the highlight and the frames that are appropriate for the highlight, to be removed from the highlight section.

As described above, in the first embodiment, the candidate section having a higher possibility for the highlight is capable of being preferentially selected as the highlight section by using the information about the lengths of the candidate sections in which the highly evaluated frames are continuously exist. Accordingly, according to the first embodiment, even when the accuracy of the method of evaluating the frames is not high, it is possible to appropriately select the highlight section finally used for the video from the candidate sections.

The candidate section having a higher possibility for the highlight is preferentially selected as the highlight section by using the information about the lengths of the candidate sections in the first embodiment described above. In a second embodiment, an example will be described in which the candidate section the length of which is short and in which no face is detected is removed from the targets to be selected as the highlight section. Such removal is performed because, when the highlight video is played back for easily and rapidly acquiring the features of the content of the original video, the candidate sections the lengths of which are short have a higher possibility of not being appropriate for the components of the highlight video, compared with the candidate sections the lengths of which are long. Since the hardware configuration of the information processing apparatus in the second embodiment is the same as that in FIG. 1 and the functional configuration of the highlight video making apparatus 200 in the second embodiment is the same as that in FIG. 2, the hardware configuration of the information processing apparatus and the functional configuration of the highlight video making apparatus 200 are omitted in the second embodiment. Only portions different from those in the first embodiment described above will be described in the following description of the second embodiment.

Figure 8:
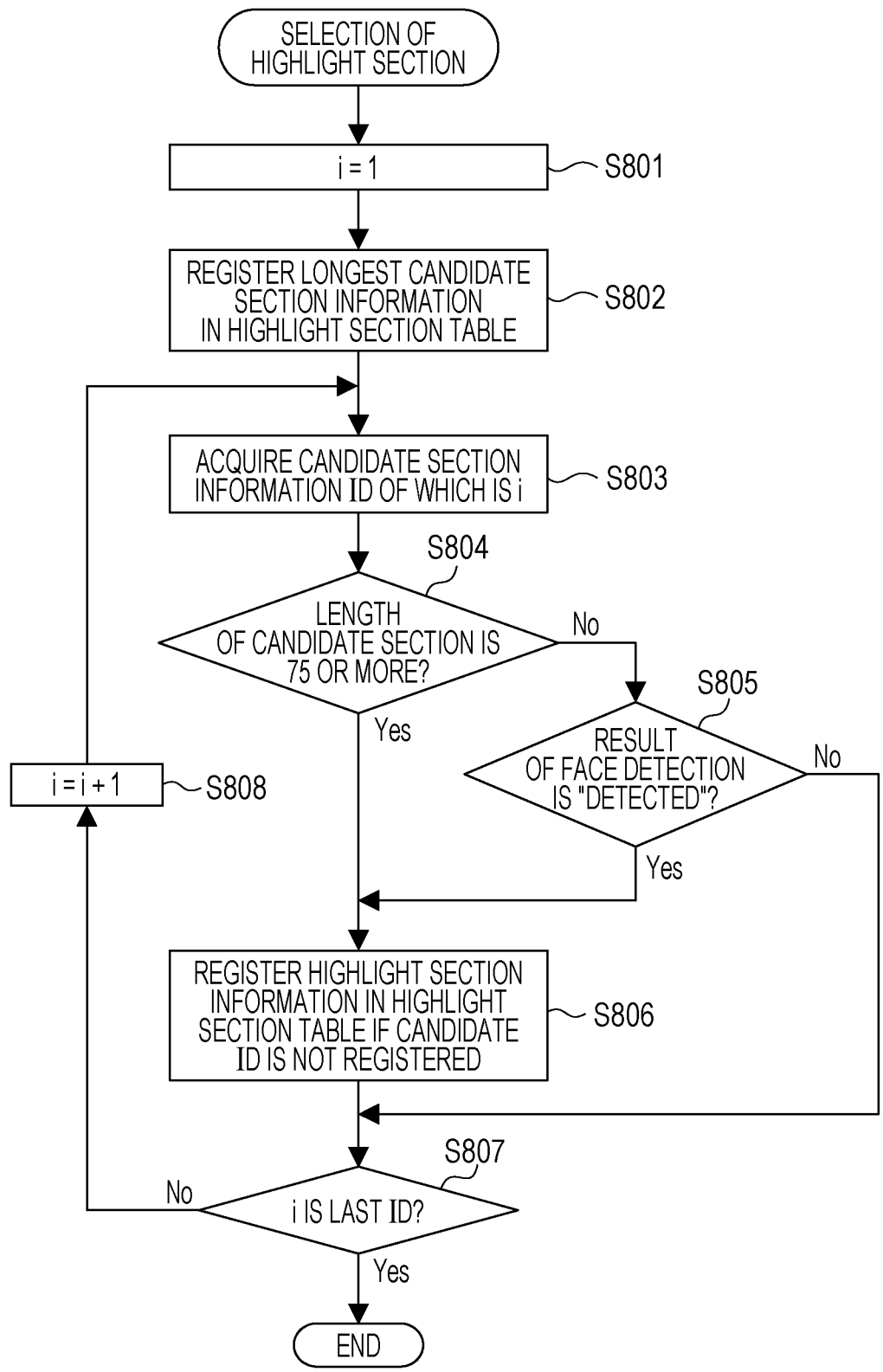
FIG. 8 is a flowchart illustrating the highlight section selecting process including removal of candidate sections in a second embodiment.

FIG. 8 is a flowchart illustrating an exemplary process of removing the candidate section having a possibility of not being appropriate for the highlight from the targets to be selected as the highlight section based on the information about the lengths of the candidate sections, instead of the selection of the highlight section through the process in FIG. 7. The process in FIG. 8 is performed by the selecting unit 204 in the second embodiment.

Referring to FIG. 8, in S801, the selecting unit 204 initializes the variable i indicating the ID in the candidate section table 401 in FIG. 4 to one. In S802, the selecting unit 204 acquires the candidate section information having the longest length in the candidate section table 401, generates the highlight section information based on the acquired candidate section information, and newly registers the generated highlight section information in the highlight section table 501. In the second embodiment, all the frames in the candidate section having the longest length are selected as the highlight section. In other words, in the highlight video that is finally made, the frames included in the candidate section having the longest length are most adopted.

In S803, the selecting unit 204 acquires the candidate section information the ID of which is i from the candidate section table 401. In S804, the selecting unit 204 determines whether the length of the candidate section is longer than or equal to 75, which is a predetermined threshold value. Although the threshold values is set to 75 here, the length of the candidate section that is likely not to be appropriate for the highlight may be used as the threshold value if such a length is experimentally or statistically acquired. Alternatively, in order to adjust the number of the highlight sections to be registered, the magnitude of the threshold value may be adjusted based on the number of the candidate sections. If the selecting unit 204 determines that the length of the candidate section is higher than or equal to the predetermined threshold value (YES in S804), the process goes to S806. If the selecting unit 204 determines that the length of the candidate section is lower than the predetermined threshold value (NO in S804), the process goes to S805.

In S805, the selecting unit 204 determines whether the result of the face detection is "Detected". If the selecting unit 204 determines that the result of the face detection is "Detected" (YES in S805), the process goes to S806. If the selecting unit 204 determines that the result of the face detection is not "Detected" (NO in S805), the process goes to S807.

In S806, that is, if either of the conditions in S804 and S805 is met, the selecting unit 204 generates the highlight section information and newly registers the generated highlight section information in the highlight section table 501. Since the longest candidate section has been registered in S802, the selecting unit 204 confirms whether the candidate section information the ID of which is i is registered as the candidate ID in the highlight section table 501 and newly registers the highlight section information only if the candidate section information the ID of which is i is not registered in S806. After S806, the process goes to S807.

In S807, the selecting unit 204 determines whether i is the last ID in the candidate section table 401. If the process goes to S807 because both the conditions in S804 and S805 are not met, the selecting unit 204 does not register the candidate section as the highlight section, that is, removes the candidate section from the targets to be selected as the highlight section and, then, determines whether i is the last ID in the candidate section table 401. If the selecting unit 204 determines that i is not the last ID in the candidate section table 401 (NO in S807), in S808, the selecting unit 204 adds one to the variable i. Then, the process goes back to S803. Accordingly, S803 to S806 are repeated until the selecting unit 204 determines that i is the last ID in the candidate section table 401 in S807. If the selecting unit 204 determines that i is the last ID in the candidate section table 401 (YES in S807), the highlight section selecting process in FIG. 8 is terminated. After the highlight section selecting process in FIG. 8 is terminated, the output unit 205 connects the selected highlight sections to make the highlight video.

As described above, in the second embodiment, the candidate sections the lengths of which are short, in which no face is detected, and which have a possibility of not being appropriate for the highlight are capable of being removed. In addition, since the candidate section is removed after the longest candidate section is registered in S802 in the second embodiment, it is possible to prevent no highlight section from being selected. The highlight section selecting process in the first embodiment described above may be combined with the second embodiment using the output from the highlight section selecting process in the second embodiment as the candidate section. This enables the candidate section having a longer length to be preferentially selected after the candidate sections having a possibility of not being appropriate for the highlight are removed.

The candidate section having a longer length is preferentially selected as the highlight section in the first embodiment. In contrast, in a third embodiment, an example will be described in which the candidate section is divided into sub-sections and the sub-sections included in the longer candidate sections are preferentially selected to enable exhaustive selection of the highlight sections. Since the hardware configuration of the information processing apparatus in the third embodiment is the same as that in FIG. 1, the hardware configuration of the information processing apparatus is omitted in the third embodiment. Only portions different from those in the first embodiment described above will be described in the following description of the third embodiment.

Figure 9:
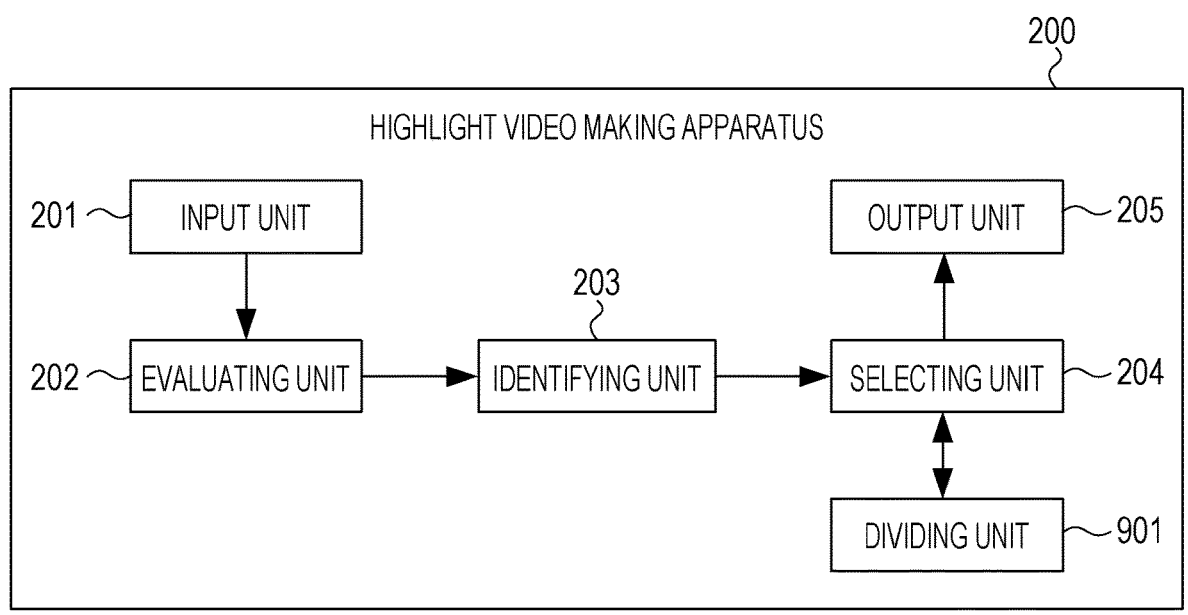
FIG. 9 is a block diagram illustrating an exemplary functional configuration of a highlight video making apparatus including a dividing unit that performs division into sub-sections in a third embodiment.

FIG. 9 is a block diagram illustrating an exemplary functional configuration of the highlight video making apparatus 200 of the third embodiment. In the functional configuration in FIG. 9, a dividing unit 901 that divides the candidate section into the sub-sections is added to the highlight video making apparatus 200 illustrated in FIG. 2.

Referring to FIG. 9, the selecting unit 204 supplies the information about the input candidate section to the dividing unit 901 and the dividing unit 901 divides the supplied candidate section into the sub-sections and supplies the sub-sections to the selecting unit 204. The selecting unit 204 receives the information about the sub-sections resulting from the division in the dividing unit 901 and performs the highlight section selecting process using the information about the original candidate section and the information about the sub-sections.

FIG. 10A to FIG. 10C illustrate exemplary tables used for managing information about the sub-sections resulting from the division in the dividing unit 901. Sub-section tables 1001 to 1003 illustrated in FIG. 10A to FIG. 10C, respectively, are each composed of sub-section information including items of ID, CANDIDATE ID indicating the ID of the candidate section to which the sub-section belongs, START FRAME ID indicating the start frame ID of the sub-section, END FRAME ID indicating the end frame ID of the sub-section, LENGTH indicating the length of the sub-section, and SCORE indicating the score of the sub-section. The sub-section table 1001 in FIG. 10A, the sub-section table 1002 in FIG. 10B, and the sub-section table 1003 in FIG. 10C indicate the same sub-section. The sub-section table 1001 in FIG. 10A indicates a state in which the scores are not registered. The sub-section table 1002 in FIG. 10B indicates a state in which the scores are being registered. The sub-section table 1003 in FIG. 10C indicates a state in which the scores are registered in all the sub-sections. ID, START FRAME ID, END FRAME ID, and LENGTH in the sub-section tables 1001 to 1003 in FIG. 10A to FIG. 10C are the same as those in FIG. 4 for the sub-sections.

Figure 11:
FIG. 11 illustrates an exemplary table used for managing section information based on the sub-section information.

FIG. 11 illustrates an exemplary table used for managing information about the result of selection of the highlight sections, which has the same configuration as that of the highlight section table 501 illustrated in FIG. 5. A highlight section table 1101 illustrated in FIG. 11 indicates the information about the highlight sections selected by the selecting unit 204 based on the information in the sub-section table 1003 illustrated in FIG. 10C.

Figure 12:
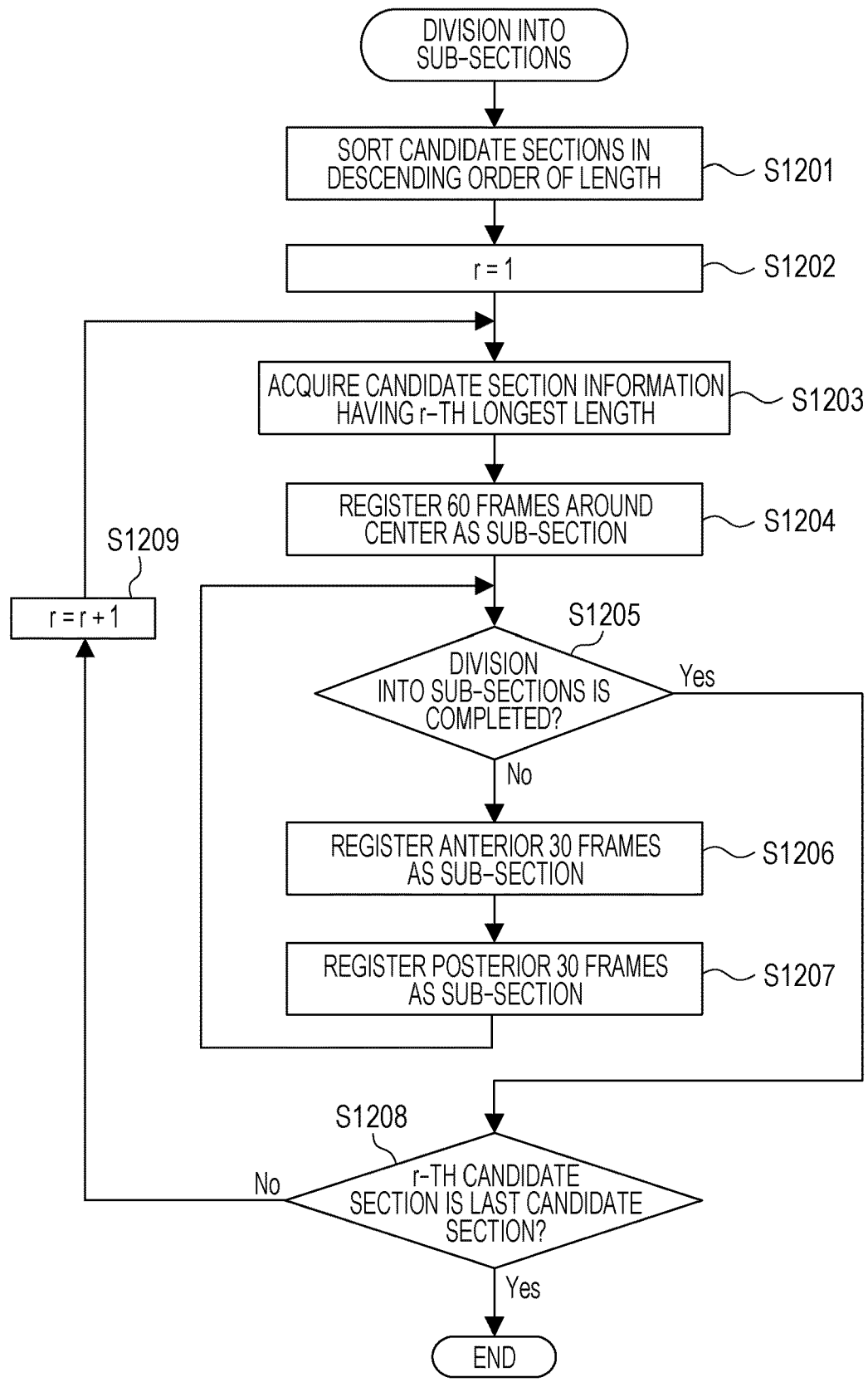
FIG. 12 is a flowchart illustrating an exemplary dividing-into-sub-sections process.

FIG. 12 is a flowchart illustrating an exemplary process of dividing the candidate section into the sub-sections based on the candidate section information in the candidate section table 401 illustrated in FIG. 4, which is performed by the dividing unit 901.

Referring to FIG. 12, in S1201, the dividing unit 901 sorts all the pieces of candidate section information registered in the candidate section table 401 in descending order of the lengths of the candidate sections. In S1202, the dividing unit 901 initializes the variable r indicating the order of the length of the candidate section to one.

In S1203, the dividing unit 901 acquires the candidate section information having the r-th longest length. In S1204, the dividing unit 901 calculates the frame IDs of, for example, 60 frames around the center from the start frame ID and the end frame ID of the candidate section information and sets the start frame ID and the end frame ID of the sub-section. In addition, the dividing unit 901 calculates the length of the sub-section, generates the sub-section information, and newly resisters the generated sub-section information in the sub-section table 1001 in FIG. 10A.

In S1205, the dividing unit 901 determines whether the division into the sub-sections is completed so that all the frames from the start frame ID to the end frame ID of the candidate section are included in any sub-section. If the dividing unit 901 determines that the division into the sub-sections is completed (YES in S1205), the process goes to S1208. If the dividing unit 901 determines that the division into the sub-sections is not completed (NO in S1205), the process goes to S1206.

In S1206, the dividing unit 901 calculates the frame IDs of, for example, 30 frames before the smallest frame ID that has been registered as the sub-section and sets the start frame ID and the end frame ID of the sub-section. The dividing unit 901 calculates the length of the sub-section, generates the sub-section information, and newly registers the generated sub-section information in the sub-section table 1001 in FIG. 10A. In S1207, the dividing unit 901 calculates the frame IDs of, for example, 30 frames after the largest frame ID that has been registered as the sub-section and sets the start frame ID and the end frame ID of the sub-section. The dividing unit 901 calculates the length of the sub-section, generates the sub-section information, and newly registers the generated sub-section information in the sub-section table 1001 in FIG. 10A. Then, the process goes back to S1205. In other words, S1206 and S1207 are repeated until the dividing unit 901 determines that the division into the sub-sections is completed in the r-th candidate section in S1205.

In S1204, S1206, and S1207, the dividing unit 901 registers the frame IDs to be registered as the sub-sections within a range that does not exceed the start frame ID and the end frame ID of the candidate section information. Although the division into the sub-sections is performed using 60 frames around the center, previous 30 frames, and subsequent 30 frames here, these values are arbitrary and other values may be used. The center position in the division into the sub-sections may be varied based on information about, for example, faces.

In S1208, the dividing unit 901 determines whether the r-th candidate section information is the last candidate section information. If the dividing unit 901 determines that the r-th candidate section information is not the last candidate section information (NO in S1208), in S1209, the dividing unit 901 adds one to the variable r. Then, the process goes back to S1203. In other words, S1203 to S1207 are repeated until the dividing unit 901 determines that the r-th candidate section information is the last candidate section information in S1208. If the dividing unit 901 determines that the r-th candidate section information is the last candidate section information (YES in S1208), the dividing-into-sub-sections process in FIG. 12 is terminated.

Figure 13:
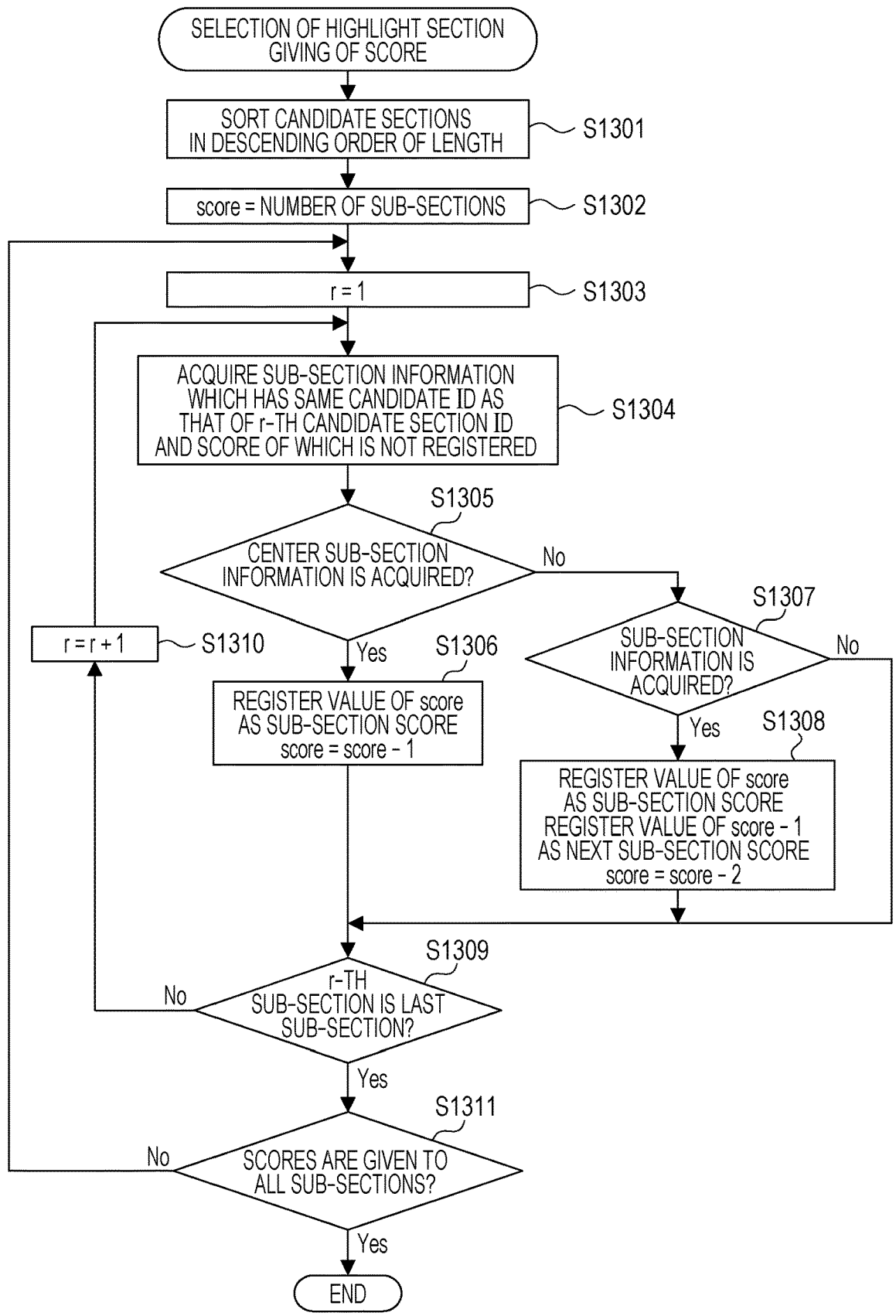
FIG. 13 is a flowchart illustrating an exemplary process of giving scores to the sub-sections.
Figure 14:
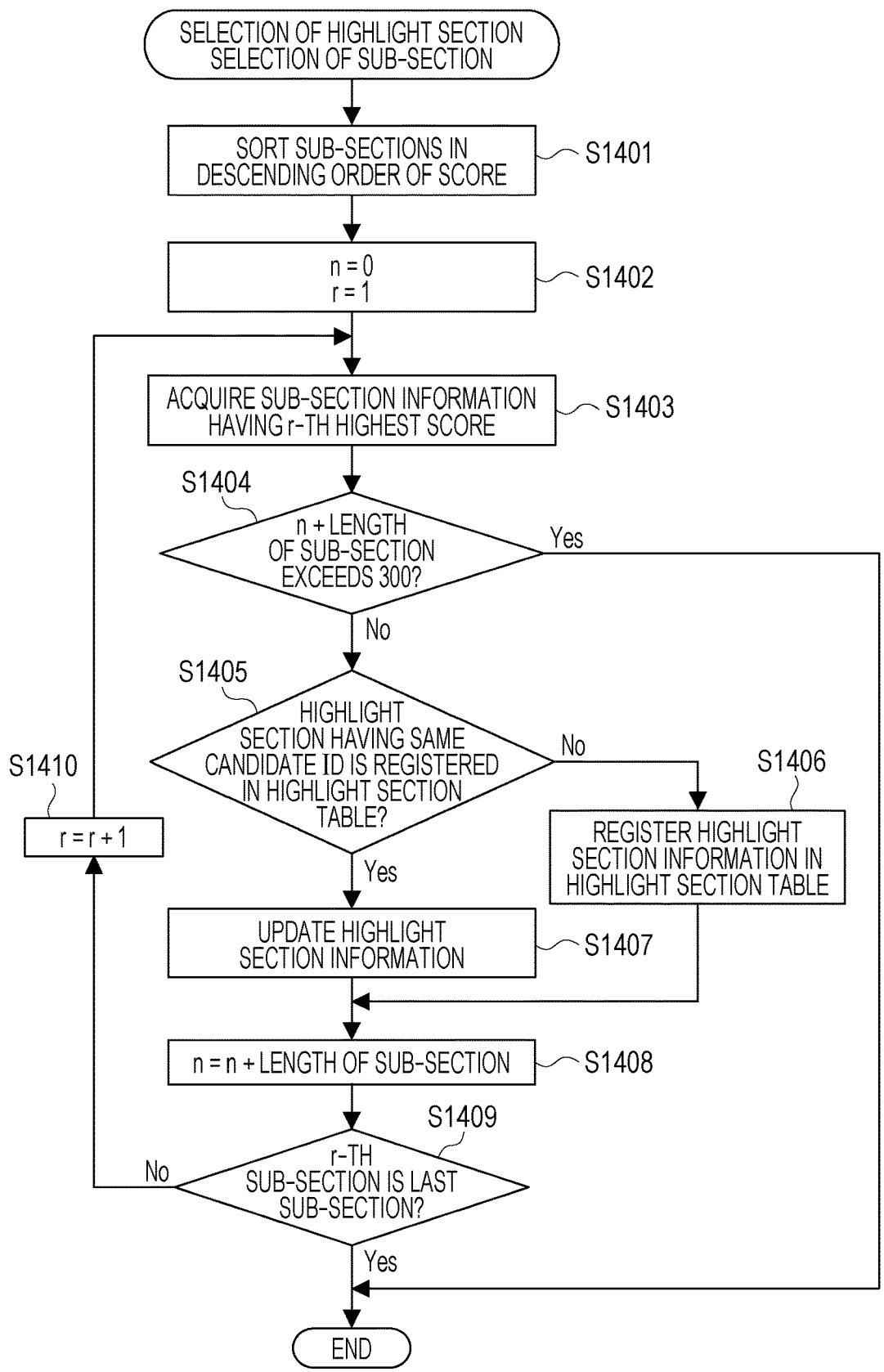
FIG. 14 is a flowchart illustrating the highlight section selecting process using the scores of the sub-sections.

FIG. 13 and FIG. 14 are flowcharts illustrating an exemplary process of giving the scores to the sub-sections and selecting the highlight section based on the scores of the sub-sections in the highlight section selecting process in FIG. 7. The process is performed by the selecting unit 204 in the third embodiment.

FIG. 13 is a flowchart illustrating an exemplary process of giving the scores to the sub-section table 1001 based on the information in the candidate section table 401 and the sub-section table 1001. The process in FIG. 13 is a preprocessing of the highlight section selecting process in the selecting unit 204.

Referring to FIG. 13, in S1301, the selecting unit 204 sorts all the pieces of candidate section information registered in the candidate section table 401 in descending order of the lengths of the candidate sections.

In S1302, the selecting unit 204 initializes a variable score indicating the score to be given to the sub-section to the number of the sub-sections registered in the sub-section table 1001. In S1303, the selecting unit 204 initializes the variable r indicating the order of the length of the candidate section to one.

In S1304, the selecting unit 204 acquires the sub-section information having the same candidate ID as that of the candidate section information having the r-th longest length from the sub-section table 1001. Here, the selecting unit 204 acquires the sub-section information the score of which is not registered and which has the smallest ID.

In S1305, the selecting unit 204 determines whether the acquired sub-section information is the first sub-section information having the same candidate ID to determine whether the acquired sub-section information indicates the center sub-section of the candidate section. For example, when the sub-section table has the state of the sub-section table 1001 and the selecting unit 204 acquires the sub-section information having the ID of "6", the selecting unit 204 determines that the acquired sub-section information indicates the center sub-section because the ID of "6" is the first sub-section information in the candidate ID of "4". If the selecting unit 204 determines that the acquired sub-section information indicates the center sub-section (YES in S1305), the process goes to S1306. If the selecting unit 204 determines that the acquired sub-section information does not indicate the center sub-section (NO in S1305), the process goes to S1307.

In S1306, the selecting unit 204 registers the value of the variable score as the score of the sub-section information and updates the value of the variable score to a value resulting from subtraction one from the variable score. Then, the process goes to S1309.

In S1307, the selecting unit 204 determines whether the sub-section information is acquired in S1304. If the selecting unit 204 determines that the sub-section information is acquired (YES in S1307), the process goes to S1308. If the selecting unit 204 determines that the sub-section information is not acquired (NO in S1307), the process goes to S1309.

In S1308, the selecting unit 204 registers the value of the variable score as the score of the sub-section information. In addition, the selecting unit 204 acquires the sub-section information of the next ID, registers the value of the variable score−1 as the score of the next sub-section, and updates the value of the variable score to a value resulting from subtraction two from the variable score. Then, the process goes to S1309. For example, when the sub-section table has the state of the sub-section table 1002 and the score of the sub-section information having the ID of "7" is to be registered, the selecting unit 204 not only registers the score of the sub-section information having the ID of "7" but also registers the score of the sub-section information having the ID of "8".

In S1309, the selecting unit 204 determines whether the r-th sub-section is the last sub-section. If the selecting unit 204 determines that the r-th sub-section is the last sub-section (YES in S1309), the process goes to S1311. If the selecting unit 204 determines that the r-th sub-section is not the last sub-section (NO in S1309), the process goes to S1310.

In S1310, the selecting unit 204 adds one to the variable r. Then, the process goes back to S1304. In other words, S1304 to S1308 are repeated until the selecting unit 204 determines that the r-th sub-section is the last sub-section in S1309.

In S1311, the selecting unit 204 determines whether the scores are given to all the pieces of sub-section information in the sub-section table 1001. If the selecting unit 204 determines that the scores are not given to all the pieces of sub-section information in the sub-section table 1001 (NO in S1311), the process goes back to S1303 to initialize the variable r to one. In other words, S1303 to S1309 are repeated until the selecting unit 204 determines that the scores are given to all the pieces of sub-section information in the sub-section table 1001 in S1311. If the selecting unit 204 determines that the scores are given to all the pieces of sub-section information in the sub-section table 1001 (YES in S1311), the score giving process in FIG. 13 is terminated.

The sub-section table 1003 illustrated in FIG. 10C indicates the state in which the scores are given to all the sub-sections in the sub-section table 1001 through the flowchart described above.

Although the scores of the sub-sections are calculated based on the information about the lengths of the candidate sections here, other information, such as the evaluation values of the frames included in the sub-sections, may be further used to calculate the scores of the sub-sections. In addition, the selecting unit 204 may correct the scores of the sub-sections based on the evaluation values of the frames included in the sub-sections, whether any face is detected, the presence of shake in the capturing of the video, the amount of shake, and so on, as in the scores of the candidate sections described above.

FIG. 14 is a flowchart illustrating an exemplary process of selecting the highlight section based on the information in the sub-section table 1003 in which the scores are given in the preprocessing in FIG. 13. The process in FIG. 14 is performed by the selecting unit 204. Referring to FIG. 14, in S1401, the selecting unit 204 sorts all the pieces of sub-section information registered in the sub-section table 1003 in descending order of the scores of the sub-sections.

In S1402, the selecting unit 204 initializes the variable n indicating the total number of frames in the selected highlight section to zero and initializes the variable r indicating the order of the score of the sub-section to one.

In S1403, the selecting unit 204 acquires the sub-section information having the r-th highest score.

In S1404, the selecting unit 204 determines whether a value calculated by adding the length of the acquired sub-section information to the variable n exceeds 300, which is a predetermined threshold value. Although 300 is used as the threshold value here, another value may be used, as in S704. If the selecting unit 204 determines that the value does not exceed the threshold value (NO in S1404), the process goes to S1405. If the selecting unit 204 determines that the value exceeds the threshold value (YES in S1404), the highlight section selecting process in FIG. 14 is terminated.

In S1405, the selecting unit 204 determines whether the highlight section having the same candidate ID as that of the sub-section is registered in the highlight section table 1101. If the selecting unit 204 determines that the highlight section having the same candidate ID as that of the sub-section is not registered in the highlight section table 1101 (NO in S1405), the process goes to S1406. If the selecting unit 204 determines that the highlight section having the same candidate ID as that of the sub-section is registered in the highlight section table 1101 (YES in S1405), the process goes to S1407.

In S1406, the selecting unit 204 generates the highlight section information and newly registers the generated highlight section information in the highlight section table 1101. Then, the process goes to S1408.

In S1407, the selecting unit 204 updates the highlight section information that has the same candidate ID and that is registered. In this updating step, the start frame ID and the end frame ID of the registered highlight section information are compared with the start frame ID and the end frame ID of the sub-section information acquired in S1403 to update the start frame ID to a lower value and update the end frame ID to a higher value. Then, the process goes to S1408.

In S1408, the selecting unit 204 adds the length of the sub-section information to the variable n to update the value of the variable n.

In S1409, the selecting unit 204 determines whether the r-th sub-section is the last sub-section. If the selecting unit 204 determines that r-th sub-section is not the last sub-section (NO in S1409), in S1410, the selecting unit 204 adds one to the variable r. Then, the process goes back to S1403. In other words, S1403 to S1408 are repeated until the selecting unit 204 determines that the r-th sub-section is the last sub-section in S1409.

If the selecting unit 204 determines that r-th sub-section is the last sub-section (YES in S1409), the highlight section selecting process in FIG. 14 is terminated.

As described above, in the third embodiment, the candidate section is divided into the sub-sections and the sub-sections included in the longer candidate sections are preferentially selected. Accordingly, the highlight sections are capable of being exhaustively selected while giving a priority to the candidate sections having a higher possibility for the highlight in the third embodiment.

In addition, in the third embodiment, after the highest score is given to the sub-section at the center of each candidate section, higher scores are sequentially given to the previous sub-section of each candidate section and the subsequent sub-section thereof. Accordingly, in the third embodiment, the previous sub-section is preferentially selected over the subsequent sub-section to gradually play back better scenes around the center of the candidate section.

The candidate sections having a higher possibility for the highlight are selected using the information about the lengths of the candidate sections, which indicates that the highly evaluated frames continuously exist, in the first embodiment described above. However, the frames having higher evaluation values do not continuously exist to be interrupted and only short candidate sections are selected to make no difference in length depending on the combination of the method of evaluating the frames with the content of the video. As a result, it is difficult to acquire the candidate sections having a higher possibility for the highlight. For example, when a video in which children play is evaluated in the case of using the face detection as a criterion of the evaluation of the frames, the children may be moving or may turn back even in a characteristic scene appropriate for the highlight. Accordingly, the faces are detected in smaller sizes or the faces are not detected and the frames having lower evaluation values are sandwiched between the frames having higher evaluation values. As a result, a case may be supposed in which the section including the continuous frames having higher evaluation values becomes short.

Accordingly, in a fourth embodiment, in the calculation of the evaluation values of the frames, such a problem is prevented from occurring by complementing the evaluation using the feature quantity acquired from the previous and subsequent frames. Since the hardware configuration of the information processing apparatus in the fourth embodiment is the same as that in FIG. 1 and the functional configuration of the highlight video making apparatus 200 in the fourth embodiment is the same as that in FIG. 2, the hardware configuration of the information processing apparatus and the functional configuration of the highlight video making apparatus 200 are omitted in the fourth embodiment. Only portions different from those in the first embodiment described above will be described in the following description of the fourth embodiment. The division into the subsections may be performed in the fourth embodiment, as in the third embodiment.

FIG. 15 illustrates an exemplary table used for managing information about each frame in the video, which is evaluated by the evaluating unit 202 in the fourth embodiment. A frame table 1501 illustrated in FIG. 15 is composed of frame information resulting from addition of COMPLEMENTARY FACE SCORE to the frame table 301 in FIG. 3 described above. COMPLEMENTARY FACE SCORE is a score resulting from acquisition of the face scores of one piece of frame information before the corresponding frame and one piece of frame information after the corresponding frame after the face scores are calculated by the evaluating unit 202 and calculation of the highest value. Although the pieces of frame information before and after the corresponding frame are acquired here, other values may be used in order to vary the complementary range. The evaluation value is a value resulting from addition of the value of the complementary face score to the luminance variation to round the result of the addition in a range from zero to one. The frame the evaluation value of which is closer to one is more appropriate for the highlight.

As described above, in the fourth embodiment, in the calculation of the evaluation values of the frames, the evaluation is complemented using the feature quantity acquired from the previous and subsequent frames. Accordingly, it is possible to acquire the candidate sections having a higher possibility for the highlight because only short candidate sections are not selected to make difference in length in the fourth embodiment.

Although the examples of the embodiments are described above, the present disclosure may be embodied by a system, an apparatus, a method, a program, or a recording medium (storage medium). Specifically, the present disclosure may be applied to a system composed of multiple devices (for example, a host computer, an interface device, an imaging apparatus, and/or a Web application) or an apparatus composed of one device.

The present disclosure is capable of being realized by one or more processors in the computer of a system or an apparatus to which a program realizing one or more functions of the above embodiments is supplied via a network or a storage medium, which read out the program for execution. The present disclosure is capable of being realized by a circuit (for example, an application specific integrated circuit (ASIC)) realizing one or more functions of the above embodiments.

While the present disclosure has been described with reference to what are presently considered to be the embodiments, it is to be understood that the technical range of the present disclosure is not limited to the disclosed embodiments. In other words, the present disclosure is capable of being realized in various aspects without departing from the technical idea or the main features of the present disclosure.

According to the present disclosure, it is possible to appropriately acquire the highlight section from the video regardless of the accuracy of the method of evaluating the frames.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2018-112751 filed on Jun. 13, 2018, which is hereby incorporated by reference herein in its entirety.

What is claimed is:
1. An apparatus that makes a highlight video, the apparatus comprising:
one or more processors; and
one or more memories,
wherein the one or more processors, by executing instructions stored in the one or more memories, function as:
an evaluating unit configured to evaluate frames included in one video based on luminance of the frames or whether a specific object is included in the frames;
an identifying unit configured to identify one or more candidate sections including continuous frames that are evaluated higher than a reference by the evaluating unit;
a selecting unit configured to preferentially select a longer candidate section from the one or more candidate sections,
wherein the selecting unit calculates a score of a candidate section using a length of the candidate section and a result of evaluation and selects a highlight section based on the score of the candidate section; and an output unit configured to make a highlight video by using frames included in the highlight section selected by the selecting unit.

2. The apparatus according to claim 1,
wherein the output unit preferentially selects a longer candidate section, among the one or more candidate sections, and connects the frames included in the selected candidate section to make the highlight video.

3. The apparatus according to claim 1,
wherein the selecting unit selects the candidate section in descending order of length from the one or more candidate sections so that a total length does not exceeds a predetermined length of the highlight video, and
wherein the output unit connects the frames included in the selected candidate section to make the highlight video.

4. The apparatus according to claim 3,
wherein the output unit most adopts the frames included in a longest candidate section, among the identified one or more candidate sections, into the highlight video.

5. The apparatus according to claim 3,
wherein the output unit preferentially selects a longer candidate section, among the one or more candidate sections, and connects the frames of a certain number around a center of the selected candidate section to make the highlight video.

6. The apparatus according to claim 1,
wherein the selecting unit removes a candidate section having a length shorter than or equal to a predetermined length from targets to be selected as the highlight section.

7. The apparatus according to claim 6,
wherein the selecting unit varies the predetermined length based on a number of the identified candidate sections.

8. The apparatus according to claim 6,
wherein the selecting unit removes the candidate section from the targets to be selected as the highlight section based on information indicating whether a specific object is detected in the frames included in the candidate section.

9. The apparatus according to claim 8,
wherein the specific object is a face.

10. The apparatus according to claim 1,
wherein, in the selection of the candidate section as the highlight section, the selecting unit selects a section resulting from removal of anterior and posterior frames of a number corresponding to a predetermined ratio from the candidate section as the highlight section.

11. The apparatus according to claim 1, further comprising:
a dividing unit configured to divide the candidate section into a plurality of sub-sections,
wherein the output unit selects one or more sub-sections from each of the one or more candidate sections sorted in descending order of length so that a total length does not exceeds a predetermined length of the highlight video and connects the frames corresponding to the selected sub-section to make the highlight video.

12. The apparatus according to claim 11,
wherein the output unit calculates a score of the sub-section using the length of the candidate section to which the sub-section belongs and the result of evaluation and selects a highlight section based on the score of the sub-section.

13. The apparatus according to claim 12,
wherein the output unit gives a higher score to the sub-section closer to a center of the candidate section.

14. The apparatus according to claim 12,
wherein the selecting unit corrects the score based on at least one of the evaluation result of the frames, whether a specific object is detected in the frames, presence of shake in capturing of a video, and an amount of shake.

15. The apparatus according to claim 11,
wherein the evaluating unit gives the evaluation result to each frame as an evaluation value, and
wherein the identifying unit identifies a section including a certain number or more of continuous frames to which the evaluation values higher than or equal to a predetermined threshold value are given by the evaluating unit as the candidate section.

16. The apparatus according to claim 1,
wherein the evaluating unit evaluates the frames to be evaluated using feature quantities of the frames to be evaluated and frames before and after the frames to be evaluated.

17. The apparatus according to claim 1, wherein the selecting unit calculates the score of the candidate section based on the length of the candidate section, the result of evaluation, and presence of shake or an amount of shake.

18. An information processing method performed by an apparatus that makes a highlight video shorter than the video, the method comprising:
evaluating whether each of the frames included in one video based on luminance of the frames or whether a specific object is included in the frames;
identifying one or more candidate sections including continuous frames that are evaluated higher than a reference in the evaluating;
select a longer candidate section from the one or more candidate sections,
wherein the selecting unit calculates a score of a candidate section using a length of the candidate section and a result of evaluation and selects a highlight section based on the score of the candidate section; and
making a highlight video by preferentially using frames included in the highlight section selected.

19. A non-transitory computer-readable storage medium storing a program that causes a computer to execute an information processing method performed by an apparatus that makes a highlight video shorter than the video, the method comprising:
evaluating whether each of the frames included in one video based on luminance of the frames or whether a specific object is included in the frames;
identifying one or more candidate sections including continuous frames that are evaluated higher than a reference in the evaluating;
select a longer candidate section from the one or more candidate sections,
wherein the selecting unit calculates a score of a candidate section using a length of the candidate section and a result of evaluation and selects a highlight section based on the score of the candidate section; and
making a highlight video by preferentially using frames included in the highlight section selected.

* * * * *